United States Patent Office 2,800,393
Patented July 23, 1957

2,800,393

DIRECT PRODUCTION OF TUNGSTEN CARBIDE FROM TUNGSTIC OXIDE

John D. Mettler, Jr., Niagara Falls, N. Y., assignor to Union Carbide Corporation, a corporation of New York No Drawing. Application June 18, 1953, Serial No. 362,667

1 Claim. (Cl. 23—208)

This invention relates to a process for producing tungsten carbide. More particularly, this invention relates to a process of producing substantially pure tungsten carbide, directly from tungsten oxide, of a controllable, very small particle size.

Heretofore tungsten carbide of high purity and small particle size has been most generally produced by reducing tungsten oxide with hydrogen to a metal of small particle size and then in a second operation converting this metal to tungsten carbide by heating with carbon in a hydrogen or carbonaceous atmosphere. In practice, this process is inherently expensive because of the dual operations involved and capital investments are high because of the duplication of equipment necessary.

In order to avoid the necessity of two steps in tungsten carbide manufacture, the so-called menstrum process has been devised in which tungsten oxide is converted directly into tungsten carbide by reaction in a matrix of a suitable metal such as iron, tin, nickel, etc. Although the two furnacing steps are avoided by this method, leaching and purification steps are added in order to effect recovery of the product. Due to incomplete solution of the matrix, certain impurities are also inherent to the product.

The principal object of this invention is to produce tungsten carbide, in a relatively simple and inexpensive process of one stage, of a high degree of purity and of a controllable particle size of less than 10 microns, by heating at definite and controlled rates, a mixture of tungstic oxide and carbon. More specifically, it is an object of the present invention to produce tungsten carbide of high purity and small particle size directly from tungstic oxide in a single step by mixing the oxide with an appropriate form of carbon and reacting the said mix at reduced pressures.

Briefly, the process of the invention comprises intimately mixing finely divided tungstic oxide ($WO_3$) and an appropriate form of carbon in stoichiometric proportions to effect reduction of the oxide and subsequent formation of tungsten carbide (WC), and heating the mixture at a definite, controlled rate to and above the temperature at which reaction first occurs, under reduced pressure, the heating rate being so regulated as to eliminate side and reversible reactions. The carbon should be in finely divided form. For that reason, a carbon black is preferred. The process of the invention takes advantage of relationships that have been discovered between rate of heating and particle size, ambient pressure and purity, geometry of the reacting mass and compositional uniformity of the product, which have not been recognized or controlled in previous processes.

The rate at which the temperature of the reaction vessel is raised, particularly above 800° C., is held quite low, say 20° C. per hour maximum, preferably 15° C. per hour, while the furnace atmosphere pressure is also kept low. This causes the reaction to proceed at low temperatures so that an extremely fine product results, thus completing the reaction before crystal growth can occur.

Tests have shown that the geometry of the reacting mass, in particular the depth of the charge in any single container, influences the compositional uniformity of the tungsten carbide. This is believed to be due to temperature gradients existing while the reacting mass is being heated above 800° C. In the furnace used for these tests, herein described, the source of heat was above the charge. With this arrangement it was found that two inch layers could be successfully processed. However, non-uniform products were obtained with layers appreciably greater than 2 inches thick. As an illustration of the results obtained in treating a charge of reacting material having a layer thickness over two inches, a sampling analysis of the carbon content in various portions of a charge having a six inch layer thickness is given below.

| Layer | Top | Middle | Bottom | Average |
|---|---|---|---|---|
| Total Carbon | 5.54 | 6.00 | 6.32 | 6.05 |
| Free Carbon | 0.03 | 0.21 | 0.41 | |

The type of carbon used, that is, the physical shape and structure of the particles, will affect the rate and types of reactions that occur. These effects may be due to the particle size and shape since these probably determine both the intimacy of contact between the carbon and the oxide particles and the apparent density of the mass. If particle contact is poor, the rate and completeness of reaction may be adversely affected. On the other hand low apparent density adversely affects the rate of heat transfer through the reacting mass. These effects may be compensated for by adjusting mixing time and charge geometry. The gas pressure during the period of increasing temperature is important since it prevents reverse reactions from occurring which would produce a non-uniform product. Although successful results can be obtained with pressures up to 5.0 millimeters of mercury, lower pressures (less than 1.0 millimeter) are preferred.

Typical examples will serve to illustrate in detail the principles of the invention.

Run "A"

Fifty pounds of pure tungstic oxid (99.9+% $WO_3$) and 10 pounds 5 ounces of a carbon black obtained by decomposition of acetylene (fixed C 98.4%; VM 1.5%) were agitated four hours in a mixing device. Near the end of the mixing cycle, 1495.5 cm.$^3$ of water and 4.5 cm.$^3$ of a suitable wetting agent were added to compact the mix. The mix was charged into carbon trays two inches deep which were then placed into a vacuum furnace. The air was pumped out of the furnace and the full power applied to the heating elements until the furnace temperature reached 400° C. Between 400 and 800° C. the rate of temperature rise was adjusted to 100° C. per hour. Throughout this period the pressure in the furnace was maintained below 1.0 millimeter of mercury. When a temperature of 800° C. was reached, the rate of heating was reduced to 15° C. per hour until the temperature reached 1110° C., at which level the temperature was held constant for two hours. At the end of the two-hour holding period the temperature was again raised at a rate of 100° C. per hour to a maximum of 1450° C. and held at that level for three hours. During the period when the charge temperature was between 800 and 1110° C., the furnace pressure reached a maximum of 2.5 millimeters due to pumping equipment limitations; at all other times the pressure was below 1.0 millimeter. Pressures as low as 0.25 millimeter were reached in some parts of the cycle. The run was completed by cooling the charge. In order to prevent loss by oxidation due to air leaking into the furnace, the charge was cooled in an atmosphere of ⅓ $H_2$ and ⅔ $N_2$. The furnace was opened and the charge removed after the latter had cooled to 80° C. maximum. The product was subjected to light milling after discharge to disperse metal powder aggregates.

Data on the product obtained in this run are shown in the summary table below:

*Run "B"*

The same procedure was followed in this run as in Run "A," including mixture composition and preparation and heating until the temperature reached 800° C. The temperature was increased from 800° C. to 1450° C. without interruption at a rate of 20° C. per hour. The furnace was held at this temperature for nine hours. The cooling cycle was identical with that of Run "A."

|  | Summary Data—Product | |
|---|---|---|
|  | Run "A" | Run "B" |
| Analysis: | | |
| $O_2$ | 0.03% | 0.04%. |
| Total Carbon | 6.00 | 5.90. |
| Free Carbon | 0.025 | 0.01. |
| Constitution, by X-ray diffraction: | | |
| W | nil | nil. |
| $W_2C$ | nil | 1%. |
| WC | 99+ | 99. |
| Particle size: Average | 2.75 microns | 2.35 microns. |

Although the examples set forth above are considered as preferred methods, it should be noted that the procedure may be varied somewhat, all within the scope of the invention.

What is claimed is:

A process of producing tungsten carbide in controllable particle sizes ranging from 0.5 micron to 10 microns, which comprises mixing tungstic oxide and carbon in proportions approximately 100 parts tungstic oxide to approximately 20 parts carbon by weight, adding to said mixture sufficient water and a wetting agent to compact said mixture, rapidly heating said mixture at an absolute pressure below 5 millimeters of mercury to a temperature of about 400° C., while maintaining said pressure, increasing the temperature to about 800° C. at a rate of about 100° per hour, increasing the temperature to about 1100° at a rate of about 15° per hour, maintaining the temperature at about 1100° C. for about 2 hours, increasing the temperature to about 1450° C. at a rate of about 100° C. per hour, maintaining the temperature at about 1450° C. for about 3 hours, and cooling said mixture in a non-oxidizing atmosphere.

References Cited in the file of this patent

UNITED STATES PATENTS

| 2,364,123 | Benner et al. | Dec. 5, 1944 |
| 2,509,838 | Oswald | May 30, 1950 |
| 2,529,778 | McKenna | Nov. 14, 1950 |
| 2,601,023 | Hurd | June 17, 1952 |

FOREIGN PATENTS

| 319,698 | Great Britain | Oct. 23, 1930 |

OTHER REFERENCES

Ivory: "Tungsten Carbide Research in Germany," PB 79296, March 1947, pp. 30–32.

Meerson et al.: "Zhurnal Prikladnoi Khimii," vol. 25, pp. 744–748 (July 1952).